April 6, 1965

R. G. MILLS ETAL 3,177,408

SUPERCONDUCTOR SOLENOID WITH OVERHEAT
PROTECTIVE STRUCTURE AND CIRCUITRY

Filed Sept. 18, 1961

INVENTORS
ROBERT G. MILLS
KENNETH E. WAKEFIELD

Fig. 3

INVENTORS
ROBERT G. MILLS
KENNETH E. WAKEFIELD
BY

April 6, 1965 R. G. MILLS ETAL 3,177,408
SUPERCONDUCTOR SOLENOID WITH OVERHEAT
PROTECTIVE STRUCTURE AND CIRCUITRY
Filed Sept. 18, 1961 6 Sheets-Sheet 3

INVENTORS
ROBERT G. MILLS
KENNETH E. WAKEFIELD
BY

INVENTORS
ROBERT G. MILLS
KENNETH E. WAKEFIELD

ENERGIZATION OF SUPERCONDUCTOR SOLENOID WITH A 20 KILOWATT MAXIMUM POWER SOURCE

Fig. 9

$$U = \tfrac{1}{2} L I$$
$$I = \tfrac{V}{L} t$$
$$U = \tfrac{1}{2} \tfrac{V^2}{L} t^2$$

Energy in Joules (1 MILLION) vs. Time in Seconds (25, 50, 75, 100), curve rising to $U_0$.

DISCHARGE OF SUPERCONDUCTOR SOLENOID WITH HIGH RESISTANCE LOAD

Fig. 10

$$U = U_0 e^{-\tfrac{2R_L}{L} t}$$

HIGH RESISTANCE ≡ SHORT DISCHARGE TIME
$R_2$ = LOAD RESISTANCE

DISCHARGE OF CONVENTION CAPACITOR BANK TO A HIGH RESISTANCE LOAD

Fig. 11

$$U = U_0 e^{-\tfrac{2t}{R_L C}}$$

HIGH RESISTANCE ≡ LONG DISCHARGE TIME

INVENTORS
ROBERT G. MILLS
KENNETH E. WAKEFIELD

Fig. 12

INVENTORS
ROBERT G. MILLS
KENNETH E. WAKEFIELD
BY of Patent sufficiently low temperature.

United States Patent Office 3,177,408
Patented Apr. 6, 1965

3,177,408
SUPERCONDUCTOR SOLENOID WITH OVERHEAT PROTECTIVE STRUCTURE AND CIRCUITRY
Robert G. Mills and Kenneth E. Wakefield, Princeton, N.J., assignors to the United States of America as represented by the United States Atomic Energy Commission
Filed Sept. 18, 1961, Ser. No. 139,018
13 Claims. (Cl. 317—123)

This invention relates to superconductors and more particularly to superconductor systems that generate magnetic fields.

According to the phenomenon of superconductivity, discovered in 1911 by Kamerlingh-Onnes, some materials exhibit a transition from a finite electrical resistivity to a zero electric restivity at a sufficiently low temperature. This behavior of zero resistivity has been observed to occur when, for example, the following elements have been cooled to the corresponding temperatures:

| Element: | Critical degrees Kelvin |
|---|---|
| Niobium | 9.22 |
| Lead | 7.20 |
| Vanadium | 4.3 |
| Tin | 3.71 |
| Indium | 3.38 |
| Aluminum | 1.15 |
| Hafnium | .35 |

Alloys of these and other elements have likewise been observed to behave in this manner at similar temperatures. In contrast, other elements such as copper, silver, gold, magnesium, iron, nickel, and cobalt and other alloys, which may be called normal resistance materials, have been cooled to temperatures as low as 0.1 degree Kelvin and have continued to have a definite and measurable resistivity.

Materials having the characteristic of zero resistance, i.e., $R=0$ at low temperature, have been referred to as superconductors and the normal resistivity of these materials have been restored suddenly by increasing their temperatures to a point at which they become superconducting. It has also been found that normal resistivity has been restored suddenly by exposing the superconductor to a magnetic field and the closer the temperature of the material to the transition or critical temperature the less has been the magnitude of the critical magnetic field $H_c$ necessary to change the phase of the material as shown by the following parabolic plot of typical boundaries:

Generally, even at low temperatures, the critical field $H_c$ has been of relatively low value, usually only a few thousand gauss for most superconductors. The passage of current through the superconductor has itself produced magnetic fields above the critical field, hence causing the superconductor to return to the normal resistance state.

Because of their zero resistance, superconductors have been advantageous for the production of magnetic fields. Such conductors, by eliminating the $I^2R$ losses of conventional normal resistance conductors, have been more efficient for generating magnetic fields. It has been found, however, that when solenoidal magnetic fields have been generated by superconductors, a large amount of energy has been stored in the form of the magnetic field produced and there has been a danger that this energy would be converted to heat sufficient to melt, vaporize or explode the superconductor, if the superconductor returned to its normal resistance state due, for example, to a refrigeration failure or an increase in the magnetic field beyond the critical field $H_c$ of the conductor. It has been universally recognized, therefore, that means for preventing such damage to the superconductor has been required.

This invention contemplates in a superconductor capable of producing solenoidal magnetic fields, means for absorbing energy from said magnetic field produced by said superconductor so as to protect the superconductor from damage due to overheating caused by a change in the superconductor to its normal resistance state. In a further aspect, this invention contemplates means for collapsing said field and means for removing energy from said field when the field thereof collapses. In a still further aspect, this invention contemplates a cryogenic electromagnet having a superconductor capable of producing solenoidal fields greater than the critical field of the superconductor and means for protecting the superconductor from damage due to its change to the normal resistance state and for receiving energy from said field. More particularly, in one embodiment, this invention contemplates in a superconductor capable of producing a high solenoidal magnetic field, means for removing energy from said field, comprising a normal resistance coil in electrical parallel with said superconductor and closely linked to said field with a larger mass than said superconductor so as to absorb energy from said field in the form of $I^2R$ losses in said coil.

The above and further novel features of this invention will appear more fully from the following detailed description when the same is read in connection with the accompanying drawings.

It is to be expressly understood, however, that the drawings are not intended to be a definition of the invention but are for the purpose of illustration only.

Figure 1:
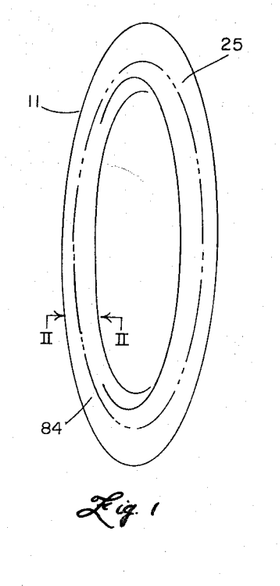
FIG. 1 is a partial isometric view of an embodiment of the solenoid of this invention.
Figure 2:
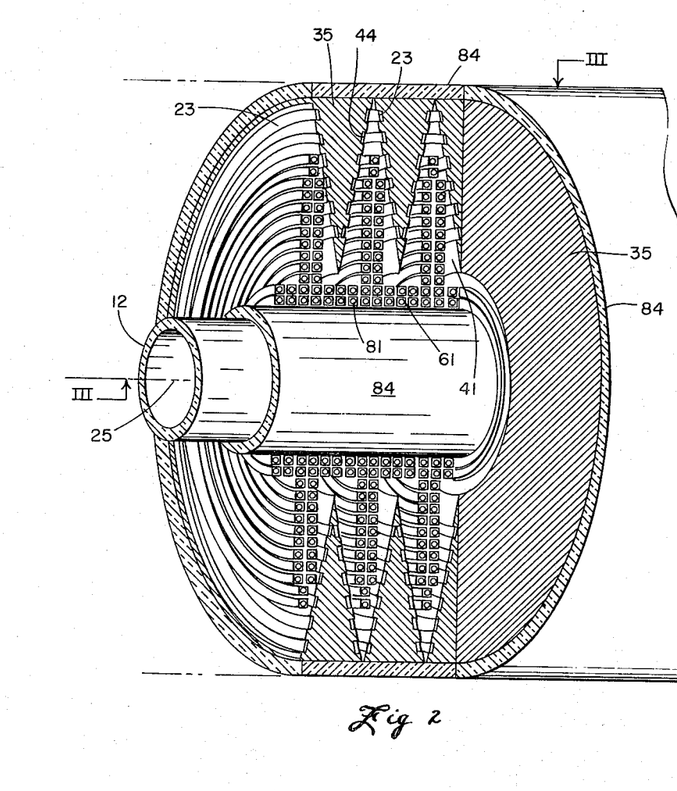
FIG. 2 is a partial cross section of FIG. 1 through II—II with elements thereof partially cut away.
Figure 3:
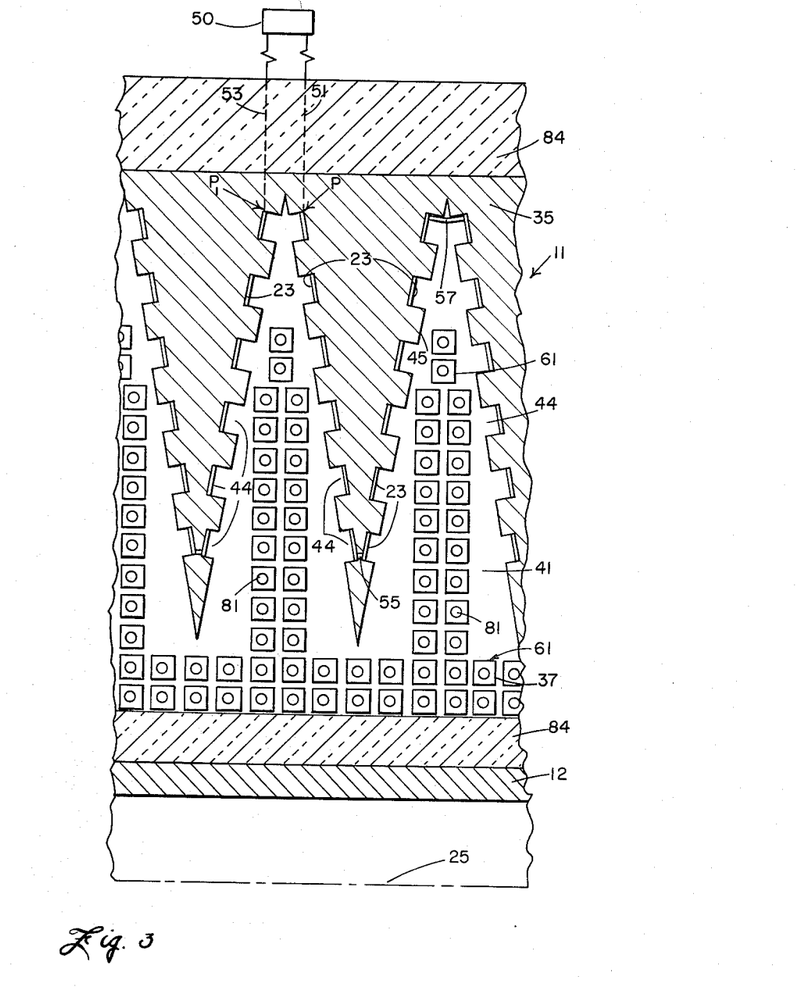
FIG. 3 is a partial cross section of FIG. 2 through III—III.

Referring now to FIG. 1, toroidal solenoid 11 may advantageously be employed with a stellarator like the experimental stellarators disclosed in "Controlled Thermonuclear Reactions" by Glasstone and Lovberg to provide a toroidal solenoidal magnetic field for the confinement of a plasma in an evacuated non-magnetic toroidal tube illustrated herein as being tube 12 shown in FIGS. 2 and 3. Also, as will be understood more fully hereinafter, the solenoid 11 may be used as an energy storage device for energizing a resistance such as a magnetic solenoid that is provided within a stellarator for confining a high temperature plasma.

Figure 4:
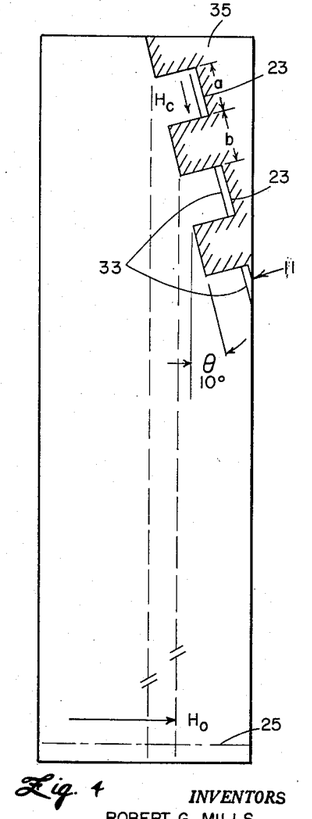
FIG. 4 shows the dimensions of the geometry of FIG. 3.

Solenoid 11 comprises a superconductor 23 that generates a high magnetic field, and in one preferred embodiment is coiled around an axis 25, illustrated herein as being a circular axis provided in a toroidal tube such as tube 12. Advantageously, the superconductor 23 has a rectangular cross section as shown in FIGS. 2 and 3 and is disposed at an angle to axis 25 so that the length along the superconductor is longer than the projection of the space between conductors on the axis 25 and the projection of the superconductor on the same axis 25. Conductor 23 is disposed in cross section at a 10° angle to the axis 25, as shown in FIG. 4. This configuration provides a corrugated current sheet around axis 25 that increases the total magnetic field strength produced along axis 25 compared with the field strength produced along axis 25 by a cylindrical conductor around axis 25. This is like the increase in field strength that would be provided by a multi-layered solenoid along axis 25 compared with the field produced by a cylindrical conductor around axis 25.

Figure 5:
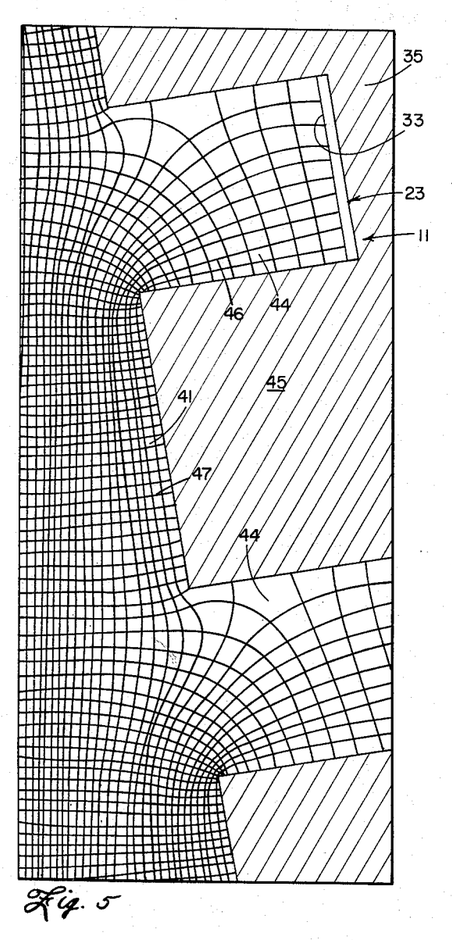
FIG. 5 is a schematic drawing of a portion of a superconductor of FIG. 3 showing the field lines and the magnetic equi-potential lines produced in the geometry of FIG. 3.

Field shaping member 35 prevents the corrugated current sheet from producing local high fields at the inner points of superconductor 23, and produces a resultant strong field along axis 25 which is stronger than the field strength tangential to the surface of the superconductor 23. As a result, the resultant field may be even stronger than the critical field $H_c$ of the superconductor 23. To this end, grooves 41 thread helically with periodic corrugations around the inside of toroidal field shaping tube member 35 coaxially with its axis 25. As shown in FIG. 3, grooves 41 have small open slots 44 along their sides. The slots 44 are spaced periodically between raised portions or denticles 45 formed by the sides of grooves 41 at an angle to the axis 25. The slots 44 are numerous and the superconductor 23 is imbedded relatively deeply therein compared to the width of the grooves 41. The field lines of the superconductor are thus shaped by member 35 to be parallel to the superconductor surface and to leave through the field shaping member 35. Advantageously, therefore, the magnetic saturation of the member 35 is not exceeded. FIG. 5 shows a single segment of the slot with magnetic field lines 46 and magnetic scaler or equi-potential lines 47 at right angles thereto. The approximately horizontal lines at the bottom of FIG. 5 are lines of constant flux and their density represents the generated field strength along axis 25 which as pointed out above may exceed the critical field $H_c$ of superconductor 23. As shown, member 35 shapes the magnetic field lines to curve the lines at the entrance to the grooves 41 and so that the lines rapidly become transverse to the grooves 41 at increasing depth. At the superconductor 23, the field has become parallel and of almost constant strength.

Substantially no flux penetrates the conductor 23 in accordance with the well-known Meissner effect described in "Superfluids" by London and in other references. As will be understood from the above, the field shaping member 35 is a field shaper which additively interacts the field lines 46 produced along the surface of adjacent conductor portions and directs the field lines 46 to create a resultant substantially uniform strong field strength along the axis 25 that is greater than the field along the surface 33 of the conductor as shown in FIG. 5. Since known high fields are generated along the axis 25, the outside portion of field shaping member 35 is easily built with sufficient thickness and strength to withstand the forces produced by the interaction of the current with the field produced.

Field shaping member 35 is advantageously made of normal resistance material with a high magnetic saturation in order to act as an efficient field shaper. In this embodiment, iron which has a saturation of 22,000 gauss is suitable but other suitable materials are:

| Materials: | Saturation of flux density $\beta$ in gauss |
|---|---|
| Cold rolled steel | 21,000 |
| 4% silicon iron | 19,700 |
| Grain orientated 4% silicon iron | 20,000 |
| Permadur | 24,500 |
| 2V Permadur | 24,000 |
| Hiperco | 24,200 |
| Dysprosium | > 25,000 |
| Erbium | > 25,000 |
| Holmium | 40,000 |

The desired relations for the dimensions of member 35 can be written in terms of the variables defined in FIG. 4. The field condition is merely a restatement of the relation $\oint H.dl = 4\pi I$, namely $aH_c = (a+b)(\sin \theta)H_0$. The flux condition recognizes conservation of flux and the fact that substantially no flux penetrates the superconductor 23 in accordance with the Meissner effect and the flux passing through slots 44 must leave through the iron without exceeding saturation or, $$bB_s = H_0(a+b)\cos\theta$$

where $B_s$ is the saturation induction of the iron. The geometrical limitations set by the properties of the material can be described by dividing the next to last equation above into the last equation above, getting:

$$\frac{B_s}{H_0} = \frac{a}{b \tan \theta}$$

Advantageously, conductor 23 has flat surfaces 33 provided by a rectangular cross section and is made of standard superconductor material such as niobium which has a critical magnetic field of about 6,000 gauss at 4° Kelvin, but other superconductor materials may be used such as the superconductor materials mentioned above, an alloy of niobium-three tin, an alloy of three parts of niobium to one part of zirconium, or an alloy of cesium, gadolinium and ruthenium. The critical field of niobium-three tin can be up to about one hundred kilogauss, and the critical field of the niobium three zirconium alloy is over thirty thousand gauss at minus 452 degrees F., at which field 100,000 amperes of electrical current per square centimeter have been passed therethrough.

Figure 6:
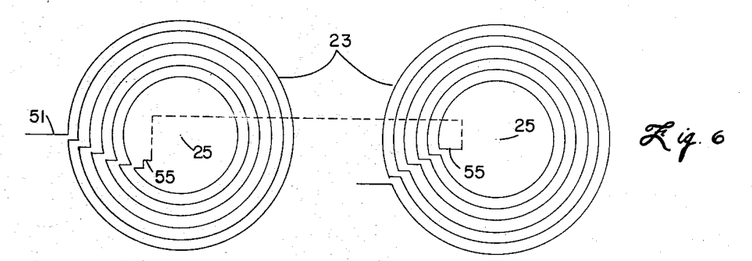
FIG. 6 is a schematic drawing of a portion of the superconductor of FIG. 2.

A suitable electrical energy source 50 energizes the superconductor 23. As illustrated herein, for example, the energy source 50 is a twenty kilowatt maximum source that has one lead 51 connected to the superconductor 23 at point P and its other lead at 53 connected to the other end of superconductor 23 at point $P_1$ so as to complete a circuit through the superconductor 23. To this end, superconductor 23 follows in the grooves 41 in series coaxially around each slot 44 and along one side of the grooves 41 first in decreasing diameter circles to a connecting lead, for example lead 55, and then along the side of the next groove 41 in increasing diameter circles, as shown in FIGS. 3 and 6, to another connecting lead, for example lead 57, as shown in FIG. 3. Thereupon the superconductor 23 winds in series coaxially in decreasing diameter circles and connects in series, as for example, by means of other similar leads 55 with the remaining grooves 41 and succeeding slots 44. The grooves 41 thread in a helix around the inside of the endless torus formed by the field shaping member 35 to point $P_1$ where the superconductor is connected to lead 53 and source 50. A suitable electrical insulator such as a coating of aluminum oxide electrically insulates conductor 23 from member 35.

The energization of superconductor 23 produces a magnetic field, along axis 25, in which large amounts of energy are stored. It has been found that the stored energy goes up as the square of the field intensity. As mentioned above, the superconductor may change status from superconducting to normal resistance, due, for example, to a failure in the refrigeration system or an increase in the field tangential to the superconductor 23 above its critical field $H_c$. This has created a danger that the energy in the field would be converted to heat sufficient to melt, vaporize or explode the superconductor, but this danger is reduced in accordance with this invention by a protective coil 61 which is wound in the magnetic field produced by the superconductor so as to absorb in said coil large amounts of said field energy in the form of $I^2R$ losses that are produced when said superconductor changes from a superconducting to a normal resistance state.

Coil 61 advantageously comprises a copper wire coiled in series in multiple layers in grooves 41 as shown, for example, in FIGS. 2 and 3 so as to have a larger mass than the mass of superconductor 23. Advantageously, coil 61 has a high specific heat and high electrical conductivity such as provided by copper. Other suitable materials, however, include gold and silver. Also, coil 61 is closely coupled inductively to conductor 23 in electrical parallel therewith and is connected at its ends to a high resistance 71. The copper wire 37 has a suitable thin insulation such as an aluminum oxide coating thereon sufficient to prevent the direct flow of current from the superconductor 23 to the copper coil 61.

The features of coil 61 are advantageous since the energy in a magnetic field goes up with the square of its intensity and high intensity is required in superconductor 23 to produce high fields. Also, as pointed out above, the high field causes a danger that a rise in temperature or change in field of the conductor 23 would cause the sudden release of this energy in the form of an explosion or other damage to conductor 23.

Coil 61 also maintains superconductor 23 below its critical temperature T, the temperature below which conductor 23 is in a superconducting phase, and to this end provides adjacent superconductor 23 a hollow channel 81 through which liquid helium circulates from a suitable liquid helium source 83. Liquid helium has a temperature of 4° Kelvin and this is well below the critical temperature of most superconductors including the mentioned niobium superconductors. Niobium by itself, for example, has a critical temperature of 9.22° Kelvin, and at 4° Kelvin niobium has a critical magnetic field of about 6,000 gauss. A suitable Dewar or superconductor insulation blanket 84 between the superconductor 23 and the ambient atmosphere blocks the flow of the heat from the ambient atmosphere to the superconductor. Also advantageously an insulation blanket 84 is provided between superconductor 23 and tube 12. Since the superconductor 23 has zero resistance, no heat is given up by the conductor and the described system adequately, simply, and efficiently cools the superconductor 23.

It will be understood that if the critical field $H_c$ is low, as it is for example with a niobium conductor 23, compared to the saturation field, $B_s$, of the ferromagnetic member 35, then a resultant field along the axis 25 can be obtained which is given by $B_{max.}=H_c \cot \theta$ where $\theta$ is the angle of the slant of the slots 44 in member 35 relative to the axis 25 (see FIG. 4). If the critical field $H_c$ is relatively high such as with niobium-three tin conductor 23, which has a high critical field, for example, up to about 100 kilogauss, a shield 35 of iron having a saturation $B_s$ of 22 kilogauss, will provide a resultant field around axis 25 of up to about 120 kilogauss in accordance with the equation:

$$B_{max.}=H_c+B_s$$

As illustrated advantageously herein, the shielding material of member 35 is iron and saturates at a field strength $B_s$ of about 22,000 kilogauss, the superconductor 23 is niobium having a critical field $H_c$ of 6 kilogauss, the angle $\theta$ is 10°, and the generated solenoidal field along axis 25 is 13 kilogauss. Also, the superconductor 23 is a wire 0.3 centimeter wide and 1.5 centimeters long in cross section, is wound to form a hollow solenoid having an inside diameter of 24 centimeters and a toroidal form with an inside diameter of 72 centimeters. Energy source 50 (shown in FIG. 7) is a twenty kilowatt maximum source which in about ten seconds is capable of storing about 125 thousand joules of energy in conductor 23. This produces a field of about 13,000 gauss along the axis 25.

The described superconductor apparatus system has the advantage over conventional systems that the superconductor is protected against damage due to a change to a normal resistance state. Also, as will be understood in more detail hereinafter, it provides a means by which the energy stored in the magnetic field can selectively be discharged rapidly to resistance 71.

Figure 8:
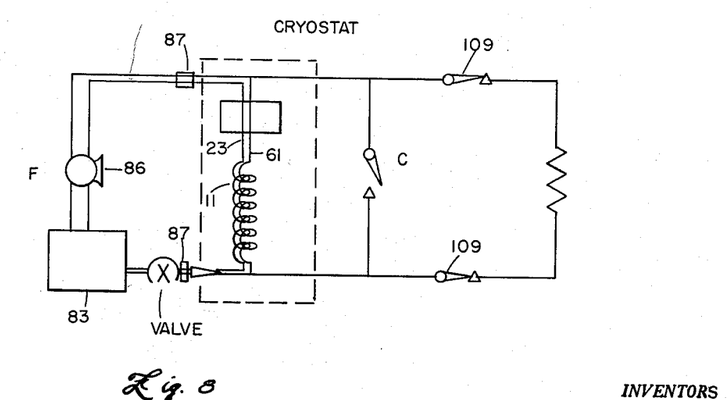
FIG. 8 is a schematic drawing of the electrical and cooling systems of the apparatus of FIG. 2.

In operation, a suitable pump 86 circulates liquid helium from source 83 through coil 61 to change conductor 23 into its superconducting phase while suitable electrical insulation 87 isolates the pumping circuit from the super conductor electrical circuit as shown in FIG. 8. Means 50 energizes superconductor 23 to produce a first field strength tangential to the superconductor, for example, a field strength up to just below the critical field $H_c$ of the superconductor. The amount of energy stored in the magnetic field produced is large because the energy stored increases with the square of the field strength along axis 25. If the superconductor 23 changes to its normal resistance state, the energy might normally be changed to $I^2R$ losses (heat) in the superconductor thus presenting a danger of damage to the superconductor. Coil 61, however, is located in the magnetic field and has a normal resistance. When the superconductor changes to a normal resistance state, the magnetic field decreases rapidly or collapses and this change in field causes current to flow in coil 61 and $I^2R$ losses (heat) to appear in the coil 61 so as to transfer energy from the field into the coil 61. Due to the coil's large mass, which is greater than that of the supeconductor, the coil's high specific heat, and high electrical conductivity, the coil 61 receives the major portion of the energy from the field, conducts electrical energy to resistance 71, and prevents damage to the superconductor due to overheating. Also, the cooling fluid in the coil 61 helps prevent damage to the coil 61 from overheating.

Figure 7:
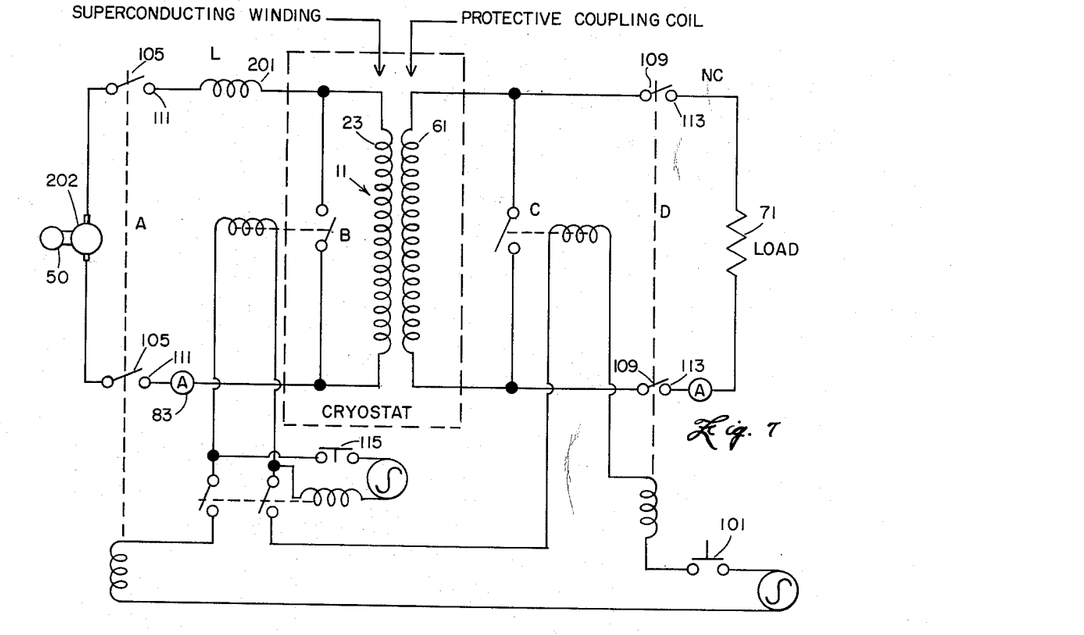
FIG. 7 is a schematic drawing of the electrical circuit for the apparatus of FIG. 2.

This function of coil 61 in safely receiving energy from the magnetic field in the form of $I^2R$ losses and providing electrical current flow to resistance 71 can also be utilized selectively to discharge the energy in the field. To this end, suitable relays and contacts such as are illustrated in FIG. 7 may be employed. As is illustrated therein, pushbutton 101 is depressed to close armatures 105 and 109 with contacts 111 and 113 respectively. This energizes superconductor 23 with a high charge, for example, when it is in its superconducting phase and disconnects load 71 from protective coil 61. The release of pushbutton 101 opens armatures 105 from contacts 111 to disconnect source 50 from superconductor 23, opens armature C and closes armatures 109 with their contacts to connect load 71 with coil 61, and closes armature B to provide an electrical circuit connecting the ends of the solenoid 11 formed by superconductor 23 in which the high charge therein and the high field produced thereby remains. Thereupon, depression of pushbutton 115 opens armature B causing the collapse of the field produced by superconductor 23 and the producing of flow of electrical energy in protective coil 61 to load 71, while the coil 61 absorbs the $I^2R$ losses (heat) therein. An inductance 201 may be used to prevent excessive current being drawn from source 50 should pushbutton 101 be released simultaneously with the depression of pushbutton 115. Control 202 controls the amount of current to superconductor 23.

Figure 9:
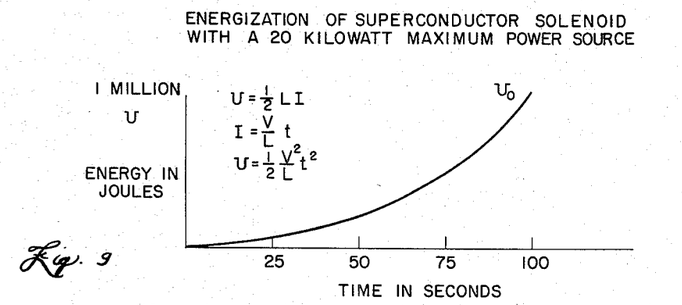
FIG. 9 is a graphic representation of the energization of the solenoid of this invention.
Figure 10:
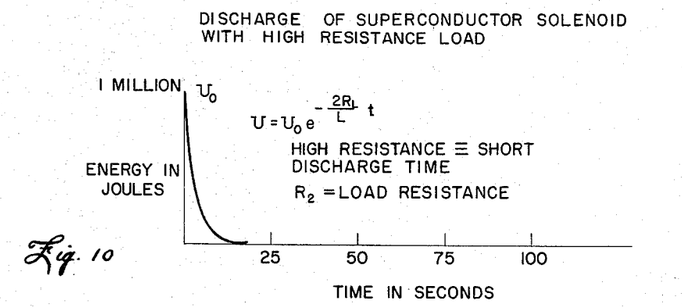
FIG. 10 is a graphic representation of the discharge to a high resistance load of the solenoid of this invention.
Figure 11:
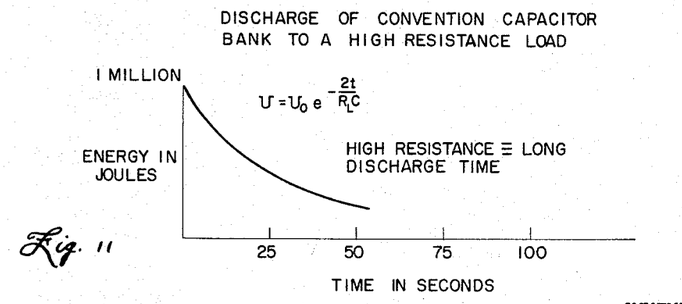
FIG. 11 is a graphic representation of the discharge to a high resistance load of a conventional capacitor bank.

Superconductor solenoid 11 can be scaled up two times to contain a charge of 1 million joules of energy as shown in FIG. 9. The energy in the superconductor may be discharged rapidly to a high resistance 71, as shown in FIG. 10, even more rapidly than a conventional capacitor bank as shown by a comparison of FIG. 10 with FIG. 11. Additionally, the use of solenoid 11 for a storage device that is rapidly dischargeable has the unexpected advantages of light weight, compactness, low cost, and safety of operation over conventional capacitor banks, for as is widely known, a capacitor bank for storing large amounts of energy is heavy, bulky, expensive, and there has been a danger of explosion with conventional fuse protectors. In the scaled up embodiment for holding one million joules, the field along axis 25 may be about 50,000 gauss and in this case the superconductor could be niobium-three tin whose critical field is above 50 kilogauss.

In summary of the above operation and the operation of the apparatus of this device for energy storage, the energy stored in the described superconductor apparatus is in the magnetic field produced thereby, and does not directly affect the temperature of the superconductor coil 23 except for $I^2R$ losses which would appear if the coil 23 were not a superconductor. A superconducting inductive energy storage device not connected to an external energy source will remain fully charged unless the superconductor returns to its normal resistance state. If this should occur in the absence of the protective coil 61 of this invention, the energy in the magnetic field would be converted to heat in the superconductor 23, resulting in an excessive (explosive) temperature rise in the superconductor 23. The protective coil 61 which also links with the magnetic field, absorbs the major portion of the field energy in the form of $I^2R$ losses (heat) in the protective winding 61 itself. Since protective coil 61 has a large mass, compared to that of the superconductor 23, the temperature rise of winding 61 will be much smaller, hence neither excessive or explosive. There is no necessary for physical contact between the protective winding 61 and the superconductor 23, other than that obviously required for support, and in particular, there need be no provision for the conduction of heat from the superconductor 23 to the protective winding 61. Since the protective coil 61 absorbs the greater portion of the energy stored in the magnetic field, the energy absorbed in the superconductor 23 when the field collapses is greatly reduced, resulting in a much smaller temperature rise in the superconductor 23 and allowing the use of the superconductor 23 to produce higher fields and to store more energy more safely than was possible heretofore.

If the critical field is exceeded during the charging process, the voltage required to maintain the current in the superconductor 23 increases, thus requiring an increase in the energy supplied to the superconductor 23. This additional energy is absorbed by the superconductor 23 in the form of heat, raising its temperature, and decreasing the critical field (see the graph shown above). Thus, the superconductor 23 very rapidly reverts to the normal resistance state. In this entire process, if the current remains constant, the field produced by the current also remains constant. All that changes is the amount of input energy required to maintain this condition. Usually, however, the energy source 50 will be unable to provide this energy, and the superconductor 23 will begin absorbing energy from the magnetic field, which collapses. However, since the protective coil 61 is connected electrically in parallel with the superconducting coil 23, the onset of this condition could be evidenced by an increase in the current in the protective coil 61. Most of the additional energy required by the systems will appear as heat in the protective coil 61, thereby slowing the process described to a point where it is possible to reduce the input current below that to produce the critical field before the temperature of the superconductor 23 has risen appreciably or to enable the liquid helium in protective coil 61 to absorb the heat generated.

Figure 12:
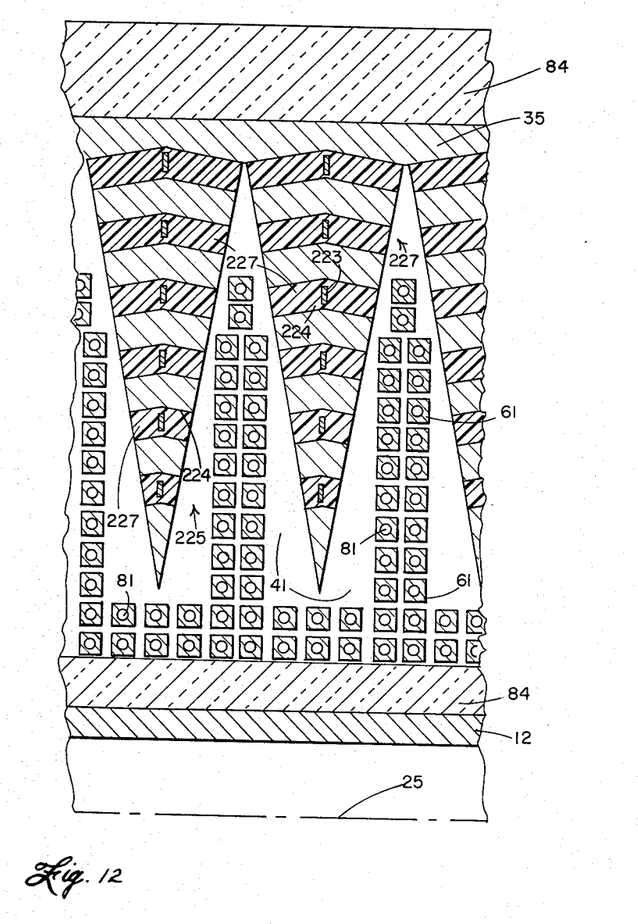
FIG. 12 is a partial cross section of another embodiment of the apparatus shown in FIG. 2.

In another embodiment of a field shaper, as shown in FIG. 12, the superconductor 223 is like superconductor 23 in material and cross section, but is arranged on the axis of the grooves 41 of FIG. 3 in slots 224 illustrated as being formed by extending slots 44 of FIG. 3 toward each other until they intersect. A force transmitting binding means 227 hold the angular portions of the field shaping member together. Advantageously, such a means 227 is a resin such as a polytetrafluoroethylene resin, polyester resin, expoxy resin, polygylcidyl novolak resin, or a diepoxide resin such as resorcinol diglycidyl ether. In this embodiment, the opposite adjacent superconductor portions are connected in parallel by separate leads to a common energy source, such as source 50.

It will be understood from the above that the parameters for the preferred embodiment are given by way of illustration for an iron field shaping member and a niobium superconductor and that the parameters for other materials will be obvious to one skilled in the art when referring to the above description.

It will be also be understood that cooling means including cooling coils in the iron member 35 adjacent the superconductor 23 and a circulating cooling fluid in the superconductor 23 may be used.

It will be understood still further that this invention has been described in an advantageous toroidal embodiment for use with stellarators but the invention may also have a straight solenoidal shape and be used advantageously for generating magnetic fields for other purposes such as for example in the generation of fields in pole pieces for masers such as described in U.S. Patent No. 2,981,894.

It will also be understood that the protective coil 61 may be used with any field producing superconductor regardless of the field strength produced thereby.

This invention provides an electromagnet having a superconductor apparatus capable of producing high magnetic fields, including fields around a hollow tube that are greater than the critical field of the superconductor, maintaining such fields for long periods of time without the expenditure of a great deal of electric power once the fields are established, protecting the superconductor from damage if it changes to a normal resistance state, and providing an efficient compact, and safe energy storage device for large amounts of electrical energy and in one embodiment includes means for collapsing the field produced by the superconductor and means for receiving energy from said field when it collapses.

What is claimed is:

1. In a superconductor capable of producing a high magnetic solenoidal field and storing large amounts of energy in said field up to one million joules, means for removing energy from said field, comprising a high specific heat normal resistance coil in electrical parallel with said superconductor, said coil having a larger mass than said superconductor and being closely linked to said field so as to absorb energy from said field in the form of $I^2R$ losses.

2. In a high critical field superconductor having ends selectively connectable in a closed circuit capable of producing a uniform high magnetic solenoidal field which remains uniform for storing large amounts energy in said field up to one million joules, means for removing energy from said field, comprising a normal resistance hollow high electrical conductivity coil closely linked to said magnetic field, said coil being adjacent said superconductor and having a larger mass than said superconductor, being in electrical parallel with said superconductor, and having means for circulating a cooling medium therethrough whereby said coil removes energy from said field in the form of $I^2R$ losses if said superconductor changes from its superconducting state to its normal resistance state.

3. In a high critical field superconductor having ends selectively connectable in a closed circuit capable of producing a uniform high magnetic solenoid up to about 50,000 gauss which remains uniform for storing up to one million joules of energy, means for removing energy from said field, comprising a normal resistance hollow copper coil closely linked with said magnetic field and being in electrical parallel with said superconductor, said coil being adjacent said superconductor and also having a larger mass than said superconductor and means for circulating liquid helium therethrough to maintain said superconductor in its superconducting state whereby said coil removes energy from said field in the form of $I^2R$ losses if said superconductor changes from its superconducting state to its normal resistance state and said field collapses.

4. In a high critical field superconductor having ends selectively connectable in a closed circuit capable of producing a uniform high magnetic solenoidal field up to about 50,000 gauss which remains uniform to store up to one million joules of energy, means for removing energy from said field, comprising means for selectively connecting and breaking a circuit between the ends of said superconductor so as selectively to maintain and collapse said field, a normal resistance hollow copper coil closely linked with said magnetic field, being in electrical parallel with said superconductor, adjacent thereto, and having a high resistance connected therewith, said coil also having a larger mass than said superconductor and means for circulating liquid helium through said coil to maintain said superconductor in its superconducting state, whereby said coil removes energy from said field when said field is collapsed.

5. In a superconductor capable of producing a high magnetic solenoidal field, comprising a superconductor coiled around an axis so that the length across the cross-section of adjacent windings of the superconductor and the space between coils is longer than said axis, means for selectively energizing said superconductor to establish a magnetic field along said axis, and means for shaping said magnetic field so as to provide a first uniform field strength tangential to said superconductor and a stronger magnetic field strength along said axis, means for removing energy from said magnetic field, comprising a normal resistance high electrical conductivity coil closely linked to said field, said coil having a larger mass than said superconductor and being in electrical parallel with said superconductor whereby said coil absorbs energy from said field in the form of $I^2R$ losses if said superconductor changes from its superconducting state to its normal resistance state.

6. A cryogenic electromagnet comprising a superconductor coiled around an axis so that the length across the cross-section of the adjacent windings of said superconductor and the space between the coils is longer than said axis, means for selectively energizing said superconductor to establish a magnetic field along said axis, means for shaping said magnetic field so as to provide a first uniform field strength tangential to said superconductor that is weaker than the magnetic field strength along said axis, a hollow normal resistance coil closely linked to said field and in electrical parallel with said superconductor, said coil having a high electrical resistance, a larger mass than said superconductor, and means for circulating a low temperature material through said coil whereby said coil removes energy from said magnetic field in the form of $I^2R$ losses if said superconductor changes from its superconducting to its normal resistance state.

7. The invention of claim 6 in which said low temperature material also cools said superconductor to its superconducting state.

8. A cryogenic electromagnet comprising a superconductor coiled around an axis and having an energizing means in operable association therewith for producing a high strength magnetic field around said axis, means for shaping the field lines of said field so as to produce a first field strength tangential to said conductor and a second stronger field strength adjacent said axis, means for selectively making and breaking a circuit between the ends of said superconductor so as selectively to maintain and to collapse said field, a normal resistance hollow coil having a high electrical conductivity in electrical parallel with said superconductor, said coil being linked to said magnetic field, having means for circulating cooling fluid therethrough, and having a high resistance connected therewith whereby said coil removes the energy from said magnetic field when said field is collapsed.

9. A cryogenic electromagnet, comprising a superconductor coiled around a toroidal axis, said superconductor having zero electrical resistance below its critical temperature and magnetic field, threaded means in operable association with said superconductor for producing a uniform high strength magnetic field around said axis, a toroidal tube having a high magnetic saturation and threads on its inside in which said superconductor is imbedded at an angle to said axis for shaping said field so as to produce a first substantially uniform field strength tangential to said superconductor and a second substantially uniform stronger field strength adjacent said axis, a hollow normal resistance coil having a high electrical conductivity in electrical parallel with said superconductor, means for circulating a cooling fluid through said coil, and a resistance coupled with said coil whereby said coil receives energy from said magnetic field if said superconductor changes to its normal resistance state.

10. A cryogenic electromagnet, comprising a superconductor coiled around a toroidal axis, said superconductor having coaxial continuous windings and means in operable association therewith for producing a strong magnetic field adjacent said axis, means having a high magnetic saturation forming coaxial slots in which said windings are imbedded so as to produce a substantially uniform field strength tangential to said windings that is weaker than the field strength adjacent said axis, a hollow normal resistance coil having a high electrical conductivity in electrical parallel with said windings, means for circulating cooling fluid through said coil and a resistance coupled with said coil whereby said coil receives energy from said magnetic field if said superconductor changes to its normal resistance state.

11. Superconducting electrical storage apparatus, comprising a high critical field solenoid superconductor around an axis, a Dewar around said superconductor, an inductance, means for energizing said solenoid through said inductance with current to produce a large magnetic field inside said solenoid along said axis, means for shaping said field so as to cause a portion of the field along said axis to be greater than the critical field of said superconductor adjacent its surface, means for disconnecting said energy source from said solenoid and substantially simultaneously connecting the ends of said solenoid in a closed circuit to maintain said field along said axis thereby to store large amounts of energy in said field along said axis, and means for discharging substantially all the stored energy in said field along said axis to a load, comprising a high specific heat, high electrical conductivity, normal resistance, coil wound on the inside of said solenoid, said coil having a larger mass than said solenoid, being adjacent thereto, insulated from said solenoid and inductively coupled to said field, means for selectively connecting said load to said coil, and means for selectively disconnecting the ends of said solenoid to collapse said field when said coil is connected to said load whereby said coil absorbs substantially all the energy from said field and transfers said energy from said field to said load in the form of an electrical current as said field collapses while greatly reducing the heat energy absorbed in said superconductor when said field is collapsed so as to prevent heat damage to said superconductor.

12. The invention of claim 11 having means for disconnecting said load from said coil when said solenoid is connected to said means for energizing said solenoid whereby said field can repeatedly store large amounts of energy and discharge it to said load.

13. The invention of claim 11 in which said solenoid produces a magnetic confining field for confining a high temperature plasma.

References Cited by the Examiner
UNITED STATES PATENTS

| | | | |
|---|---|---|---|
| 770,432 | 9/04 | Kinraide | 336—231 X |
| 1,837,413 | 12/31 | Dobson | 336—223 X |
| 2,616,022 | 10/52 | Arnaud | 336—223 X |
| 3,008,044 | 11/61 | Buchhold | 317—158 |

SAMUEL BERNSTEIN, *Primary Examiner.*